（12）United States Patent
Bertacco et al.

(10) Patent No.: US 8,341,473 B2
(45) Date of Patent: Dec. 25, 2012

(54) MICROPROCESSOR AND METHOD FOR DETECTING FAULTS THEREIN

(75) Inventors: Valeria Bertacco, Ann Arbor, MI (US); Todd Michael Austin, Ann Arbor, MI (US); Smitha Shyam, San Jose, CA (US); Kypros Constantinides, Ann Arbor, MI (US); Sujay Phadke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 13/242,906

(22) Filed: Sep. 23, 2011

(65) Prior Publication Data

US 2012/0011422 A1  Jan. 12, 2012

Related U.S. Application Data

(62) Division of application No. 13/036,276, filed on Feb. 28, 2011, now Pat. No. 8,051,368, which is a division of application No. 12/252,861, filed on Oct. 16, 2008, now Pat. No. 7,966,538.

(51) Int. Cl.
*G01R 31/28* (2006.01)
(52) U.S. Cl. ........................ 714/726; 714/724
(58) Field of Classification Search ............. 714/733, 714/734, 30, 726, 742, 736, 799, 724, 727, 714/729; 716/100, 101, 112, 136, 52
See application file for complete search history.

(56) References Cited

U.S. PATENT DOCUMENTS

| 4,625,308 | A |   | 11/1986 | Kim et al. |
| 5,233,615 | A |   | 8/1993 | Goetz |
| 5,832,297 | A | * | 11/1998 | Ramagopal et al. ............. 710/5 |
| 5,875,324 | A | * | 2/1999 | Tran et al. ..................... 712/238 |
| 7,243,283 | B2 |  | 7/2007 | Onodera |
| 7,424,658 | B1 |  | 9/2008 | Ghosh Dastidar |
| 7,634,702 | B2 |  | 12/2009 | Kim et al. |

OTHER PUBLICATIONS

Austin et al., Making Typical Silicon Matter With Razor, IEEE, Mar. 2004, pp. 57-65.
Bower et al., Tolerating Hard Faults in Microprocessor Array Structures, International Conference on Dependable Systems and Networks (DSN), Florence, Italy, Jun. 2004, pp. 1-10.
Bower et al., A Mechanism for Online Diagnosis of Hard Faults in Microprocessors, 38th Annual International Symposium on Microarchitecture (MICRO), Barcelona, Spain, Nov. 2005, pp. 1-12.
Bradley et al., Immunotronics—Novel Finite-State-Machine Architectures With Built-In Self-Test Using Self-Nonself Differentiation, IEEE, vol. 6, No. 3, Jun. 2002, pp. 227-238.
Heath et al., A Defect-Tolerant Computer Architecture: Opportunities for Nanotechnology, Science, vol. 280, Jun. 12, 1998, pp. 1716-1721.
Klein Osowski et al., The NanoBox Project: Exploring Fabrics of Self-Correcting Logic Blocks for High Defect Rate Molecular Device Technologies, IEEE, ISVLSI 04, Feb. 19, 2004, pp. 1-6.

(Continued)

*Primary Examiner* — Phung M Chung
(74) *Attorney, Agent, or Firm* — Brooks Kushman P.C.

(57) ABSTRACT

A microprocessor has a silicon area comprising a plurality of transistors implemented on the silicon area and a fault detection circuit occupying less than 20% of the silicon area and configured to detect faults at runtime in at least 80% of the plurality of transistors.

1 Claim, 5 Drawing Sheets

OTHER PUBLICATIONS

Martinez et al., Cherry: Checkpointed Early Resource Recycling In Out-Of-Order Microprocessors, Micro 02, Nov. 18, 2002, pp. 1-12.

Mitra et al., Robust System Design With Built-In Soft-Error Resilience, IEEE Computer 05, Feb. 2005, pp. 43-52.

Qureshi et al., Microarchitecture-Based Introspection: A Technique for Transient-Fault Tolerance in Microprocessors, DSN 05, Jun. 28, 2005, pp. 1-10.

Schuchman et al., Rescue: A Microarchitecture for Testability and Defect Tolerance, IEEE, ISCA 05, Jun. 4, 2005, pp. 1-12.

Shivakumar et al., Exploiting Microarchitectural Redundancy for Defect Tolerance, ICCD 03, Oct. 13, 2003, pp. 1-14.

Teodorescu et al., Swich: A Prototype for Efficient Cache-Level Checkpointing and Rollback, IEEE, Micro 06 Sep. 2006, pp. 28-40.

Weaver et al., A Fault Tolerant Approach to Microprocessor Design, DSN, Jul. 2001, pp. 1-10.

Bolchini et al., A State Encoding for Self-Checking Finite State Machines, IEEE, ASPDAC 95, Aug. 29, 1995, pp. 711-716.

* cited by examiner

INPUT CONFIGURATIONS FOR CELL USE

| | PROTECT | SCANDATA_EN | MAINDATA_EN | AUX_CLK |
|---|---|---|---|---|
| Normal op. – no protection | 0 | 0 | 0 | 0 |
| Normal op. – with protection | 1 | 1 | 1 | 0 |
| Shift out SI or error signal | 0 | 1 | 0 | 0 |
| Main FF data to scan chain | 0 | 0 | 1 | 0 |
| Test FF for hard failure | 0 | 1 | 1 | Single pulse |

MICROPROCESSOR AND METHOD FOR DETECTING FAULTS THEREIN

CROSS-REFERENCE TO RELATED APPLICATIONS

This application is a divisional of application Ser. No. 13/036,276, filed Feb. 28, 2011, which is a divisional of application Ser. No. 12/252,861, filed Oct. 16, 2008, the contents of each of which are hereby incorporated by reference in their entirety, application Ser. No. 12/252,861 claims the benefit of Provisional Application No. 60/999,442, filed Oct. 18, 2007, FIGS. 1 and 2 of which are hereby incorporated by reference.

STATEMENT REGARDING FEDERALLY SPONSORED RESEARCH OR DEVELOPMENT

The invention was made with Government support under CCR0093044 awarded by the National Science Foundation. The Government has certain rights in the invention.

BACKGROUND

As silicon technologies move into the nanometer regime, there is growing concern for the reliability of transistor devices. Device scaling may aggravate a number of long standing silicon failure mechanisms, and it may introduce a number of new non-trivial failure modes. Unless these reliability concerns are addressed, component yield and lifetime may soon be compromised.

The following list highlights certain silicon faults.

Device Wear-Out—Metal electro-migration and hot carrier degradation are traditional mechanisms that lead to eventual device failure. While these mechanisms continue to be a problem for deep-submicron silicon, new concerns arise due to the extremely thin gate oxides utilized in current and future process technologies, which lead to gate oxide wear-out (or time dependent dielectric breakdown). Over time, gate oxides can break and become conductive, essentially shorting the transistor and rendering it useless. Fast clocks, high temperatures, and voltage scaling limitations are well-established architectural trends that conspire to aggravate this failure mode.

Transistor Infant Mortality—Extreme device scaling also exacerbates early transistor failures, due to weak transistors that escape post-manufacturing testing. These weak transistors work initially, but they have dimensional and doping deficiencies that subject them to much higher stress than normal. Quickly (within days to months from deployment) they break down and render the device unusable. Traditionally, early transistor failures have been addressed with aggressive burn-in testing, where, before being placed in the field, devices are subjected to high voltage and temperature testing, to accelerate the failure of weak transistors. Those that survive this grueling birth are likely to be robust devices, thereby ensuring a long product lifetime. In the deep-submicron regime, burn-in becomes less effective as devices are subject to thermal run-away effects, where increased temperature leads to increased leakage current, which in turn leads to yet higher temperatures and further increases in leakage current. The end result is that aggressive burn-in can destroy even robust devices. Manufacturers may be forced to either sacrifice yield with an aggressive burn-in or experience more frequent early transistor failures in the field.

Manufacturing Defects that Escape Testing—Optical proximity effects, airborne impurities, and processing material defects can all lead to the manufacturing of faulty transistors and interconnect. Moreover, deep-submicron gate oxides have become so thin that manufacturing variation can lead to currents penetrating the gate, rendering it unusable. In current 90 nm devices, these oxides are only about 20 atoms thick. In 45 nm technology, this thickness is expected to be below 10 atoms. Thus, small amounts of manufacturing variation in the gate oxide can lead to currents penetrating the gate, rendering the device unusable. This problem is compounded by the immense complexity of current designs, which may make it more difficult to test for defects during manufacturing. Vendors may be forced to either spend more time with parts on the tester, or risk having untested defects escape into the field.

DETAILED DESCRIPTION

Figure 1:
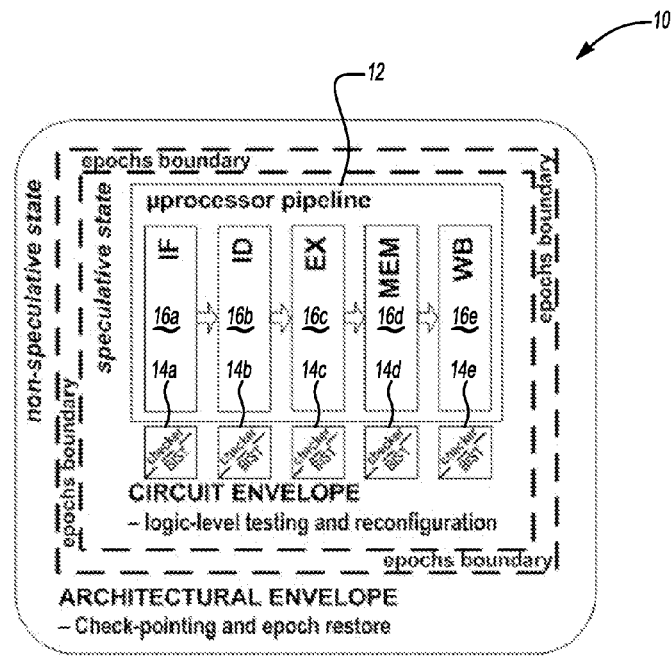
FIG. 1 is a block diagram of an embodiment of a fault tolerant microprocessor system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In certain embodiments, a mechanism to protect a microprocessor pipeline and on-chip memory system from silicon defects is provided. Area-frugal on-line testing techniques may be combined with system-level checkpointing to provide reliability. As an example, a microarchitectural checkpointing mechanism may create speculative computational epochs during which distributed domain-specific on-line test techniques are used to verify the integrity of the underlying hardware components. If at the end of an epoch the hardware is determined to be correct, the speculative computation of the epoch is allowed to commit. Otherwise, the program state is rolled back to the beginning of the epoch, and the defective component is disabled, thereby allowing the processor to continue correct execution in a degraded performance mode. Such techniques may perform well for desktop and server microprocessors. As another example, on-line testing infrastructure may be used to tune frequency and voltage to eliminate ambient temperature and voltage margins. Similarly, a microarchitectural checkpoint mechanism may also be used to provide support for transient fault tolerance or speculative shared memory access.

Some techniques discussed herein utilize a microarchitectural checkpointing mechanism to create coarse-grained epochs of execution, during which distributed on-line built in self-test (BIST) mechanisms validate the integrity of underlying hardware. If a fault is detected, the redundancy of instruction-level parallel (ILP) processors may be relied on to repair the system such that it can still operate in a degraded performance mode.

Using detailed circuit-level and architectural simulation, it was found that certain techniques provide high coverage of silicon defects, e.g., 89%, with little area cost, e.g., 5.8%. Additionally, if a defect occurs, the subsequent degraded mode of operation was found to have only moderate performance impacts.

Certain embodiments may target low in-field defect rates and may be installed into a microprocessor product. The system's health may be monitored until the first defect is encountered. At that point, the system may stay operative but at a lower performance level. The user (and/or system controller) may be notified and may have to choose to either: i) live with the degraded mode performance or ii) repair the system. System-level repair techniques that identify faulty components and swap in a new processor transparently to the user are also contemplated.

A combination of on-line distributed testing and microarchitectural checkpointing may be leveraged to efficiently identify defects, and recover from their impact. Some microarchitectural checkpointing mechanisms may provide a computational epoch, which in certain embodiments, is a period of computation over which the processor's hardware is checked. During a computational epoch, on-line distributed built-in self-testing (BIST) techniques may exploit idle cycles to verify the functional integrity of the underlying hardware. When the on-line testing completes without finding faults, the underlying hardware is known to be free of silicon defects, and the epoch's computation may be allowed to safely retire to a non-speculative state. By contrast, if the underlying hardware is found to be faulty, the results of the computational epoch may be thrown away, and the system's state may be restored to the last known-good machine state at the start of the epoch. Before continuing execution from this point, the defective component may, for example, be disabled and the system may continue in a performance degraded mode without the broken resource.

Referring now to FIG. 1, an embodiment of a fault tolerant microprocessor system 10 is illustrated. As discussed below, a microprocessor pipeline 12 may be equipped for defect protection. Component-specific hardware testing blocks 14n (14a-14e) may be associated with each design component 16n(16a-16e) to implement test generation and checking mechanisms. If a fault occurs, it may be possible that results computed in the microprocessor core are incorrect. A speculative "epoch"-based execution, however, may guarantee that the computation can be reversed to the last known-correct state. As apparent to those of ordinary skill, the system 10 is implemented in silicon and thus the outermost box of FIG. 1 defines the silicon area of the system 10.

Some microarchitectural checkpoint and recovery mechanisms create computational epochs. A computational epoch may be a protected region of computation, typically at least 1000's of cycles in length, during which the occurrence of any erroneous computation (in this example due to the use of a defective device) can be undone by rolling the computation back to the beginning of the computational epoch. During the computational epoch, on-line distributed BIST-style tests may be performed in the background, checking the integrity of some/all system components. This checking may occur while functional units, decoders and other microprocessor components are idle, as is often the case in a processor with parallel resources.

Figure 2:
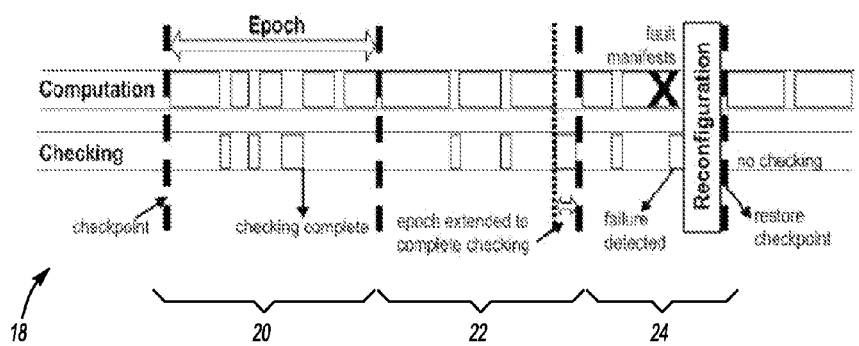
FIG. 2 is a timeline of execution for an example microarchitectural checkpoint and recovery mechanism.

Referring now to FIG. 2, a timeline 18 of execution that demonstrates the operation of an example microarchitectural checkpoint and recovery mechanism is illustrated. At the end of a computational epoch, there may be three possible scenarios that control logic may handle. The first scenario (shown in epoch 20) occurs when the checking completes before the end of the computational epoch. In this scenario, the hardware is known to be free of defects. Thus, the results of the computational epoch are known to be free of defect-induced errors, and it can be safely retired to non-speculative storage.

In the second scenario (shown in epoch 22), the computational epoch ends before the on-line testing infrastructure could complete the testing of all of the underlying hardware components. This scenario can occur because certain microarchitectural checkpointing mechanisms may have only a finite amount of storage into which speculative state can be stored. Once this space is exhausted, the computational epoch may end. Additionally, I/O requests can force early termination of a computational epoch. In this event, testing may be the only activity allowed on the processor, and it may run to completion while the processor pipeline is stalled. If at the end of this testing the hardware is still deemed free of defects, the epoch's speculative state can safely retire to non-speculative storage.

The third scenario (shown in epoch 24) occurs when the on-line testing infrastructure encounters a defect in an underlying component due to transistor wear-out, early transistor failure, or manifestation of an untested manufacturing defect. In this event, the execution from the start of the computational epoch to the point where the defect was detected cannot be trusted as correct, because this unchecked computation may have used the faulty component. Consequently, the results of the computational epoch are thrown away, and the underlying hardware may be repaired, for example, by disabling the defective component. In a processor with instruction-level parallelism (ILP), there are typically multiple copies of virtually all components. Once a component is disabled, the processor may continue to run in a performance-degraded mode. Additionally, a software interrupt may be generated which notifies the system that the underlying hardware has been degraded, so the user can optionally replace the processor.

On-line testing infrastructure is responsible for verifying the integrity of the underlying hardware components in certain embodiments. Some of the testing techniques are adopted from built-in self-test (BIST), although they are tailored to minimize the area of the testing hardware, and hence the area of the defect-protection infrastructure. For each of the pipeline components, a high quality input vector set may be stored in an on-chip ROM, which is fed into the modules during idle cycles. A checker may also be associated with each component to detect any defect in the system. Certain systems and techniques utilized to verify the integrity of underlying hardware are illustrated in FIGS. 3 through 7 and described below.

Figure 3:
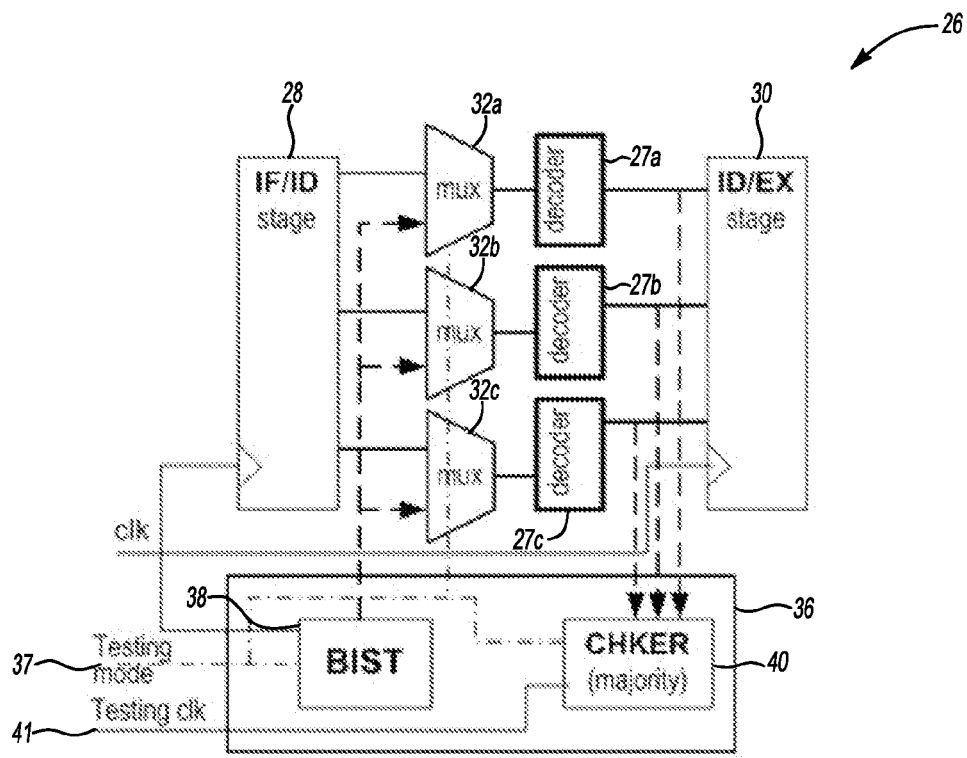
FIGS. 3 through 5 are block diagrams of embodiments of microprocessor pipelines and test harnesses.

Referring now to FIG. 3, a microprocessor pipeline 26 may include an instruction decode stage comprising decoders 27n (27a-27c), pipeline registers 28 between the fetch and decode stages and pipeline registers 30 between the decode and execute stages. Several multiplexers 32n (32a-32c) may be included in the processor's decode logic. The multiplexers 32n enable the system to send testing values from a test harness 36 (described below) or values from the instruction fetch/decode registers 28 to the decoders 27n. The control signal of the multiplexers 32n is the testing mode signal 37.

The test harness 36 for the microprocessor pipeline 26 may include a BIST module 38 and a checker block 40. The BIST module 38 may generate test vectors. In certain embodiments, the test vectors are generated by reading an internal memory, in others they may be generated at runtime by a linear-feedback shift register or by other logic components. Embodiments that generate test vectors leveraging a mix of the solutions above are also contemplated. A test vector may be funneled to all the decoders 27n through the multiplexers 32n, for example, only when the testing mode is active. The response values from the decoders 27n are then collected by the checker block 40. The checker block 40 determines if the decoders 27 provided the correct response to each test vector. In certain embodiments, the checker block 40 may determine the correctness of the responses by simply comparing the decoders' responses against each other. In other embodiments, for instance, if half or more of the decoders 27n may be faulty, or if there is only a small number of decoders 27n, the checker block 40 may store the correct responses in an internal memory. The checker block 40 may be active only during the testing mode, as indicated by a testing mode signal 37. Moreover, the checker block 40 may be operating on a separate testing clock 41, which may be providing an early clock edge so that wear-out faults manifesting with increasing response delay may also be detected.

In the event that the checker block 40 detects an incorrect response to the test vector, it determines that at least one of the decoders 27n has experienced a defect-related failure. The checker block 40 may be equipped to pinpoint which of the decoder(s) 27n has experienced a failure, possibly with the aid of additional test vectors. In certain embodiments, it may be possible to fully test one of the decoders 27n for stuck-at-0 and stuck-at-1 faults by using only 63 carefully selected vectors.

Figure 4:
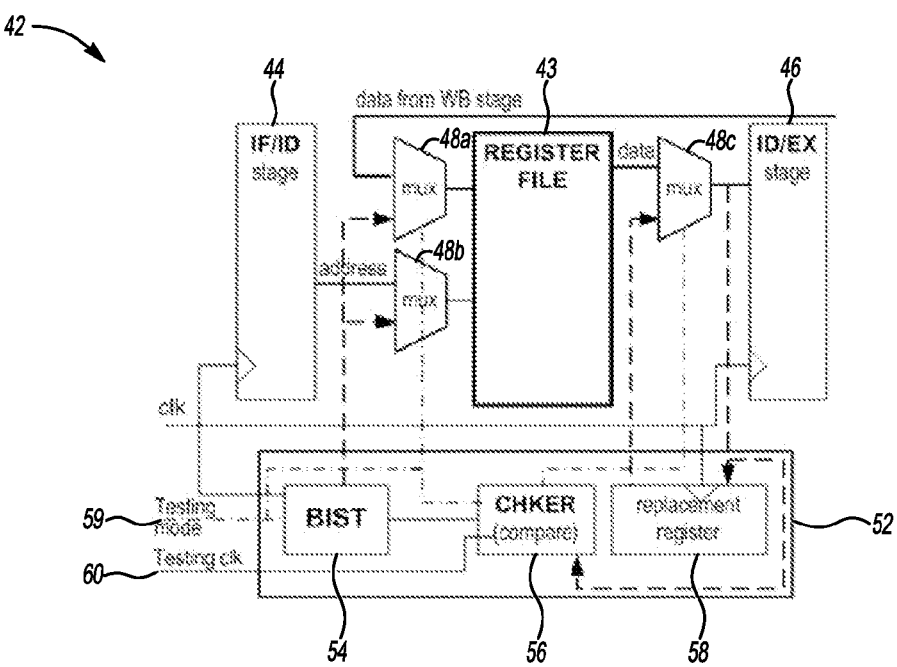

Referring now to FIG. 4, a microprocessor pipeline 42 may include a register file 43 included between instruction fetch/decode pipeline registers 44 and instruction decode/execute pipeline registers 46. Several multiplexers 48n (48a-48c) may be serially connected between the pipeline registers 44, 46 and the register file 43 to enable the selection between test signals from a test harness 52 (described below) and other processor signals from the pipeline registers 44 and/or register file 43.

The test harness 52 for the microprocessor pipeline 42 may comprise a BIST module 54, a checker block 56 and one or more replacement registers 58. The BIST module 54 may generate one or more test vectors. Such test vectors may be directed to the read ports of the register file 43 when a testing mode signal 59 is active. During one of the subsequent clock cycles, the test vector stored in the register file 43 is read and sent to the checker block 56 through the multiplexer 48c. The checker block 56 compares the value read from the register file 43 with the test vector generated in the BIST block 54. If the comparison indicates a mismatch, the corresponding register in the register file 43 may be faulty and the logic connections are modified to permanently use one of the replacement registers 58 instead of the original register.

While a register in the register file 43 is being tested, its original value may be temporarily stored in the replacement register 58. Thus, if the checker block 56 determines that the response to the test vector is correct, the original value can be transferred from the replacement register 58 to the register file 43. More specifically, register file integrity may be checked using a four phase split-transaction test procedure in certain embodiments. The register file 43 may include two address decoders (one for read and one for write), which permit testing of address decoder faults. In the first phase, a register file entry may be read from the register file 43 and stored in the replacement register 58. Testing of that register may now proceed whenever free read/write ports are available. If the register being tested is read or written by the processor, the value may be supplied by the replacement register 58. The same register may be used to repair a broken entry as described below. In the second phase, a test vector (generated, for example, with a linear feedback shift register or stored within the BIST block 54) may be written into the register being tested, and in the third phase it may be read back out and compared to the original vector. In the last phase, the register file entry (originally read out into the replacement register 58 during the first phase) may be written back into the appropriate register.

This process may effectively test both the register storage as well as the address decoders in the register file 43. The register storage may be tested by writing and reading a value from the register. The address decoders may be tested by virtue of the fact that the value written and read is fairly unique, i.e., it is randomly generated, thus if either the read or write address decoder incurs a defect, some other (likely another register value) value will incorrectly appear during the read phase of the register file testing. Because the value stored in the register file entry under test is available at all times from the replacement register, the testing process may be implemented as a series of split transactions. Consequently, different phases may be implemented in non-subsequent cycles, whenever a free port is available on the register file 43. The register file testing procedure may be repeated until all of the registers have been validated. In certain embodiments having a processor with 32 registers, the register file 43 may be fully tested with 128 cycles, spread out over an entire computational epoch in cycles when the register file 43 is not in use. The checker block 56 may also rely on a testing clock signal 60 so as to detect failures revealed by the increasing propagation delay of signals.

Figure 5:
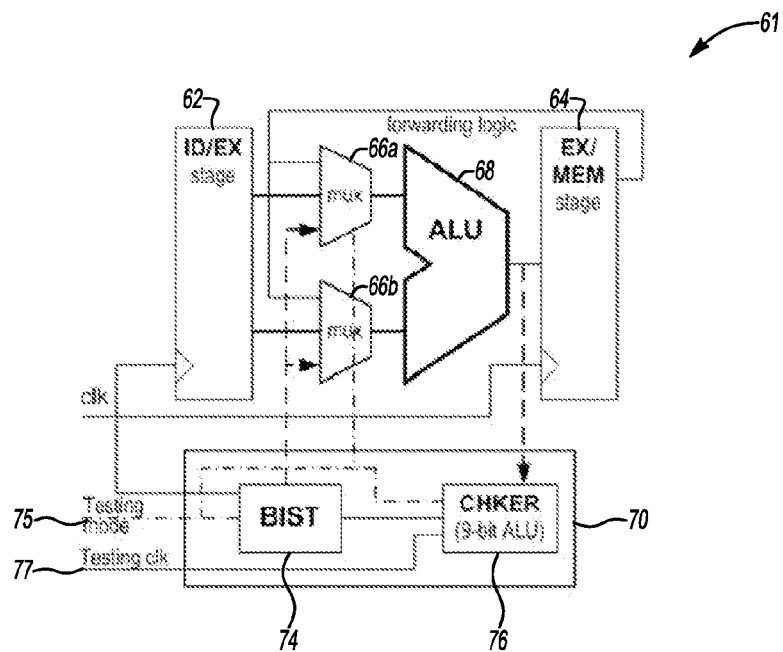

Referring now to FIG. 5, a microprocessor pipeline 61 may include an execution logic block between instruction decode/execute pipeline registers 62 and execute/memory pipeline registers 64. An arithmetic logic unit (ALU) 68 may be serially connected between the pipeline registers 62, 64 to execute the arithmetic operations specified by the instructions in execution. Multiplexers 66n (66a and 66b) may be included to enable the selection of test inputs sent to the ALU 68 instead of pipeline register values.

A test harness 70 for the microprocessor pipeline 61 may include a BIST module 74 and a checker block 76. The BIST module 74 may generate one or more test vectors, which are sent to the ALU 68 when a testing mode signal 75 is selected. The response of the ALU 68 is routed to the checker block 76 to validate that it corresponds to the correct response to the test inputs. In certain embodiments, the checker block 76 may include an ALU of smaller datapath width then the main ALU 68. In these embodiments, the checker block 76 may check the correctness of the test responses by performing the same computing as the ALU 68 over a small bit-interval of the input vectors. The checker block 76 could compute the full response over several cycles of computation, by sliding the bit-interval at each cycle.

The ALU 68 may be checked using the mini-ALU 76. During each cycle, a test vector from the BIST module 72 is given to the ALU 68 and compared with the output of the mini-ALU 76. It may take several cycles for the mini-ALU 76 to test the full output of the main ALU 68. For example, if the main ALU 68 is 32-bit wide, the mini-ALU 76 could be 9-bit wide and validate one test vector response over four cycles of computation. The 9-bit ALU 76 may be used to validate the carry out of each $8^{th}$ bit in the 32-bit output. The same type of ALU checker 76 may also be used to verify the output of the address generation logic. Using the mini-ALU checker 76, it is possible to fully verify that the ALU 68 circuitry is free of stuck-at-0 and stuck-at-1 faults with only 20 carefully selected test vectors in some embodiments. The checker block 76 may also rely on a testing clock signal 77 so as to detect failures revealed by the increasing propagation delay of signals.

A similar approach may be used to validate the multiplier, which employs arithmetic residue checks. Given an n-bit operand x, the residue $x_r$ with respect to r is the result of the operation x % r. When applied to multiplication, residue codes adhere to the following property: $(x_r * y_r) = (x*y)_r$. When the value of $r=2^a-1$ for some a, the residue operations are much simpler to implement in hardware. The resulting multiplication checker may require only a shifter and simple custom logic. Residue codes may detect most of the faults in a multiplier except those that manifest as multiples of the residue (a small class of faults where a single fault at an internal node could manifest as a multiple of the correct value on the output). The errors missed by the residue checker may be caught by a few additional selected test vectors, against which the exact output is matched. By using this approach, the multiplier may be fully tested for stuck-at-0 and stuck-at-1 faults with a total of only 55 test vectors in certain embodiments.

Figure 6:
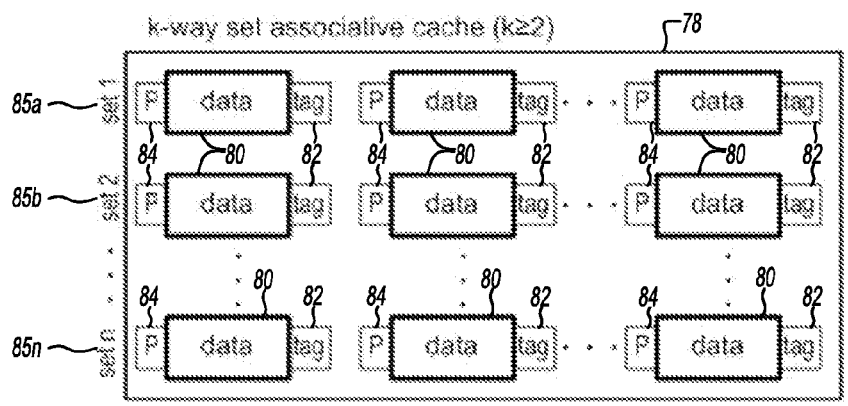
FIG. 6 is a block diagram of an embodiment of a cache.

Referring to FIG. 6, a k-way associative cache ($k \geq 2$) 78 includes a plurality of cache lines 80, each including a tag 82, and parity bits 84. As apparent to those of ordinary skill, the cache lines 80 are arranged into a plurality of sets 85n. The parity bits 84 store the parity of the data in their corresponding cache line 80. Thus if a fault occurs in any cache line 80, the fault can be exposed upon the first cache line read operation by detecting an error on the line's parity. Specifically, cache line integrity may be maintained through the use of cache line parity. Each of the parity bits 84 holds the parity of the cache line data 80 and the corresponding tag 82, valid bit, and LRU state for the line 80. When data is written to the cache 78, the parity bit 84 for the updated line 80 is re-generated and stored. Subsequently, when a cache line 80 is read, the parity is recomputed from the data values, tag, valid bit and LRU state to verify the contents. In the event that the parity is correct, notwithstanding a multi-bit failure, the cache line 80 is known to be correct. In some embodiments, it may also be possible to detect multi-bit failures by augmenting each cache line 80 with several bits for error detection. It is also possible to implement error correction mechanisms by using these same additional bits.

In the event that a cache line parity check fails, a defect has been detected within the storage of the cache 78. Consequently, the affected line 80 may be disabled from further use and execution may be rolled back to the last checkpointed computational epoch. Cache lines 80 may be disabled by setting a two bit field in the LRU state table, which indicates which line 80 in the current set 85n has been disabled. The disable bits in the LRU table may be periodically reset to avoid soft errors in caches being interpreted as hard errors and rendering the cache lines 80 unusable for the rest of the design's lifetime. Furthermore, at the end of each computational epoch, dirty cache lines 80 may be checked and written back to the next level of the memory hierarchy to guarantee recoverability in the presence of cache silicon defects. This approach is area-efficient, but it may only support a single failed line 80 per set 85n of the cache 78. Additional failed lines 80 could be supported within a single set 85n if more disable bits were to be included in the LRU logic.

A consideration in the testing of hardware components may be the timing of the test vector samples. Since many transistor wear-out-related failures manifest as progressively slower devices, the failure of the device may occur in a way where timing is no longer met for the component's critical path.

Figure 7:
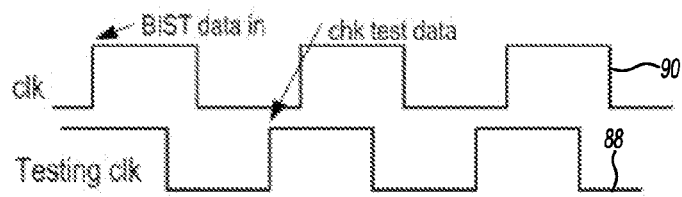
FIG. 7 illustrates waveforms of an example clock and testing clock.

Referring now to FIG. 7, this issue may be addressed by utilizing a separate clock signal 88 for sampling and evaluating test vector outputs. The testing clock signal 88 should present the latching edge slightly before the latching edge of the main clock 90, thus shortening the length of the clock cycle available to the testing hardware to evaluate the correctness of the test vector response. The goal is that of detecting hardware failures that have an increased propagation delay as a leading indicator. Safety margins in propagation delays are typically included in the design of current microprocessors to accommodate variation effects, such as process, temperature and voltage variations. These safety margins make use of a slightly shorter cycle testing clock viable, leading to a negligible amount of false positives. By using, for example, a shorter clock cycle for the testing harness 78 illustrated in FIG. 6, it may be possible to ensure that if a device is failing by showing slower response, the failure can be detected long before it affects any processor computation, since the computation operates on the main clock cycle 90, longer than the testing cycle 88.

A microarchitectural rollback mechanism may be relied on to restore correct program state in the event of defect detection. During the execution of a computational epoch, the processor may make register and memory updates which would need to be discarded if a fault is detected. To prevent any memory updates with corrupted data, such updates may be buffered in a speculative state within the processor, until the hardware is checked and certified to be functionally correct. The same level of fault coverage is not feasible by simply stopping the computation and running the built-in tests on a regular basis (without any checkpointing) and reconfiguring the pipeline if a fault is found. In fact, with this approach it would not be possible to ensure that a detected fault had not corrupted earlier computation. In contrast, with certain microarchitectural checkpointing facilities, the state of the machine may be rolled back to the point when an on-line testing pass successfully completed (a point in the computation known to be correct). In addition, once the hardware is repaired, the program may be restarted from this checkpoint.

Figure 8:
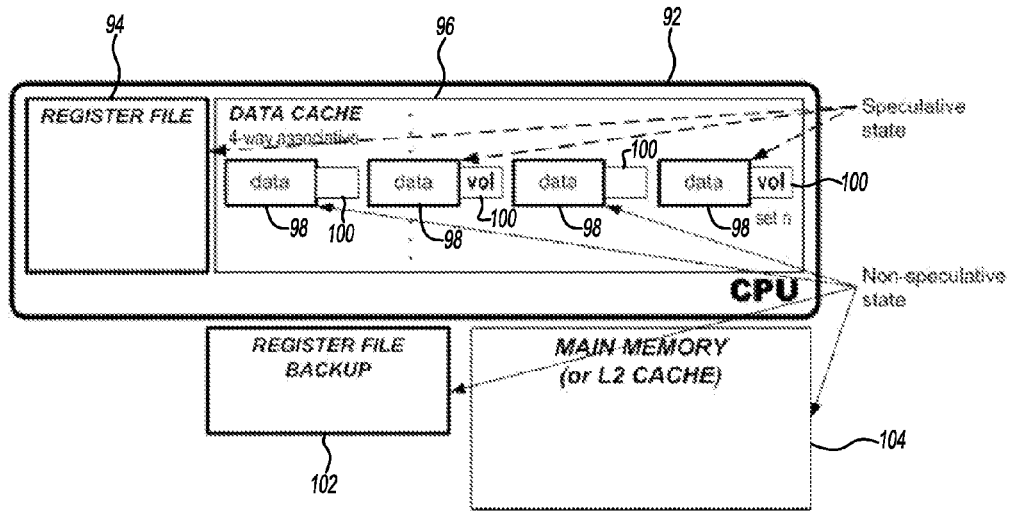
FIG. 8 is a block diagram of an embodiment of a central processing unit.

Referring now to FIG. 8, a central processing unit 92 includes a register file 94 and data cache 96. The data cache 96 includes cache lines 98 and volatile bits 100 associated with each of the cache lines 98. To preserve the state of the microprocessor 92 at the beginning of a computational epoch, the values stored in the register file 94 may be backed-up into a backup register file 102. In certain embodiments, the backup register file 102 may be implemented as a dedicated single-port SRAM to limit the area overhead of the back up storage space. Moreover, in some embodiments, the register file backup may be implemented with a "lazy" policy, whereby individual registers are backed-up and copied to the backup register file 102 only if and when they are about to be overwritten for the first time within an epoch.

Cache data may also be preserved at the beginning of a computational epoch. In some embodiments, this may be accomplished by copying the entire state of the cache 96 onto main memory 104. In other embodiments, memory updates may be buffered within the local cache hierarchy 96 to limit the data transfer overhead.

To implement an in-cache speculative state, each cache line 98 may be augmented with a "volatile" bit 100. All cache lines 98 are set as non-volatile (that is the volatile bits 100 are reset) at the beginning of a computational epoch. During the computation occurring within an epoch, when a value is stored to the cache 96, the volatile bit 100 of the corresponding target cache line 98 is set to indicate that the contents are speculative with respect to the current epoch. The end of an epoch is then determined by the ability of the local cache hierarchy 96 to buffer the memory updates issued during the epoch. If a cache miss occurs on a cache set in which all of the cache lines 98 have already been marked as volatile, then one of the lines 98 storing speculative data must be evicted. Since this event would allow for speculative information to exit the cache 96/microprocessor system 92, the computational epoch should end and the testing sequences should complete first, to determine that the values computed up to this point are valid. When the event triggering the end of a computational epoch occurs, the processor 92 may stall until the testing sweep is complete. Once the testing sequence is completed, if no hardware failure is detected, the state of the cache 96 can be considered valid and correct, thus all the volatile bits 100 are reset and a new computational epoch may begin. If a hardware failure is detected, it may be necessary to retrieve the processor state from the beginning of the epoch. Specifically, the register file 94 may be overwritten with the register file backup 102. Moreover, the cache 96 should be updated by marking invalid all the cache lines 98 for which the volatile bit 100 had been set, thus invalidating the speculative state.

Once the underlying hardware is determined to be defect-free, an epoch may end. At this point, all volatile bits 100 from the cache lines 98 are cleared, moving all formerly speculative state to non-speculative. To minimize performance costs associated with starting epochs, i.e., copying the register file and clearing volatile bits, each epoch may be extended as long as possible, until when speculative state resources are exhausted or a high-priority I/O request is generated. To provide even longer epochs, a small fully associative victim cache for volatile cache lines may be introduced, so that the end of an epoch may now be designated by a cache miss on a cache set with all its lines being marked as volatile, and while the victim cache is full of volatile lines. The above discussion assumes a uni-processor environment; therefore, delaying the commit of stores to non-speculative storage has no effect on the system's performance.

If only one checkpoint of the microprocessor's architectural state is preserved, there is a possibility that errant computation from a new defect manifestation could be missed. If a hardware check completes before a fault manifests, it becomes possible for an errant computation to be generated later in the same computational epoch. In this event, corrupted state updates would be committed to non-speculative state at the end of the epoch. The manifested fault may eventually be detected in the next epoch, but not before erroneous computation had a chance to be committed to non-speculative storage. This issue may be solved by adopting a two-phase commit procedure, which maintains two checkpoints of the processor's state.

To implement this two-phase commit in certain embodiments, an additional bit for each L1 data cache line may be used. An additional backup register file may also be used so that the microprocessor's architectural state can be stored alternatively to one or the other of the two backup register files. The microprocessor's state for the last two epochs may thus be available. Lines in the L1 data cache may be marked (using the two volatile bits) as being either non-speculative, in the previous epoch, or in the current epoch. At the end of each epoch, the volatile bits of the previous epoch are cleared, and the tags of the current epoch are updated to indicate that they refer to the previous epoch. During the new epoch, any access to the previous epoch's state is first copied into the current epoch before being written, so that the previous epoch's state is not corrupted.

In the presence of a fault, recovery to a correct microprocessor architectural state may be accomplished by flushing the pipeline and copying the architectural registers from the backup register file. The memory system is protected against possible corrupted updates issued after the fault manifestation by invalidating all the cache lines marked as volatile in the local cache hierarchy. Therefore, the presence of the fault is transparent to the application's correct execution. To provide forward progress, the defective module cannot be disabled via hardware reconfiguration.

In the event of a fault manifestation, certain embodiments of the microarchitectural checkpointing mechanism may restore correct program state. Before execution can safely continue, however, the underlying hardware should be repaired. The redundancy of ILP processors may be relied on to reduce the cost of repair. Faulty components may be removed from future operations, and the pipeline can keep running in a performance-degraded mode. To implement pipeline repair, the following facilities may be included in certain designs:

1) Faulty functional units, such as ALUs, multipliers and decoders may be disabled from further use. Consequently, further execution may limit the extent of parallelism allowed.
2) Faulty register file entries may be repaired using the replacement register 58 as illustrated in FIG. 4. The replacement register 58 may overwrite a single entry of the register file 43, thus, any value read or written to the defective register is now serviced by the replacement register 58.
3) Faulty cache lines may be excluded using a two-bit register in the LRU logic. Upon detecting a faulty line, the LRU state register may be updated to indicate that the defective line is no longer eligible as a candidate line during replacement.

Given enough silicon defects, it may be no longer possible to tolerate another defect in a particular subcomponent. The degree to which defects can be tolerated is dictated by the number of redundant components available. In general, with N components, it may be possible to tolerate N−1 defects. Once the N−$1^{th}$ component fails, the hardware may generate a signal to the operating system to indicate that the system is no longer protected against defects.

If the fault is the result of a transistor slowdown, e.g., due to gate oxide wear-out or negative-bias temperature instability, it may be possible to recover the faulty component by slowing down the system clock or increasing the component's voltage.

Instructions that perform input and output requests may require special handling in some defect tolerant microprocessor design. Since I/O operations are typically non-speculative, they may be executed at the end of a computational epoch. To accommodate them efficiently, three types of I/O requests may be introduced into a design: high-priority, low-priority and speculative (the type of I/O request may be associated with the memory address, and it may be specified in the corresponding page table entry).

High priority I/O requests are deemed time sensitive, thus, they force the end of a computational epoch, which may force the processor to stall to complete the testing sweep. After this, the I/O request executes safely, and another epoch can start immediately after it.

Low priority I/O requests are less time sensitive, thus, are held in a small queue where they age until the end of the current epoch, when they are all serviced. To prevent I/O starvation in programs with long computational epochs, low-priority I/O requests are only allowed to age for a small fixed period of time, e.g., about one microsecond. In addition, the computational epoch should end when any attempt is made to insert a low-priority request into a full I/O queue.

Speculative I/O requests are I/O requests that are either insufficiently important to care about the impacts of unlikely defects, e.g., writes to video RAM, which could be easily fixed in the next frame update, or they are idempotent, e.g., the reading of a data packet from a network interface buffer. Such requests are allowed to execute speculatively before the end of a computational epoch. If a defect is encountered during the epoch in which they execute, they will just be re-executed in the following epoch, once the defective component has been disabled.

In some embodiments, disabling defective functional units may require multiple units of each class, otherwise, a single defect in a critical non-replicated unit could render the processor broken. Additionally, cache organization may be set-associative to accommodate both speculative and non-speculative state.

A detailed physical design of a 4-wide VLIW processor including instruction and data caches, and enhanced with certain technology described herein is presented below.

The 4-wide VLIW prototype was specified in Verilog, and synthesized for minimum delay using Synopsys Design Compiler. This produced a structural Verilog netlist of the processor mapped to Artisan standard cell logic in a TSMC 0.18 μm fabrication technology. The design was then placed and routed using Cadence Sedsm, which in turn yielded a physical design with wire capacitances and individual component areas. The design was then back annotated to obtain a more accurate delay profile, and simulated to verify timing and functional correctness with Synopsys PrimeTime.

For each component and test vector set, it was verified that all stuck-at-0 and stuck-at-1 faults were detected. In general, test vector sets were identified using hand-selected vectors, or by randomly cycling through random vector sets until a small group of effective vectors was located. Test vector coverage was verified by inserting a hard fault at each net of the design and then determining if a change in the output was observable for the current input test vector set. For a test vector set to provide full coverage, there should be at least one vector that identifies a hard fault in all nets of the design. Once the test vector set was identified, it was encoded into an on-chip ROM storage unit, created using Synopsys design tools.

Architectural evaluation was done using the Trimaran tool set, a re-targetable compiler framework for VLIW/EPIC processors, and the Dinero IV cache simulator. The simulator was configured to model the VLIW baseline configuration and memory hierarchy as detailed below. The designs were evaluated using benchmarks from SPECint2000, MediaBench and MiBench benchmark suites. These benchmarks cover a wide range of potential applications, including desktop applications, server workloads and embedded codes.

Coverage analysis was implemented by injecting faults into a logic timing level simulation of the detailed VLIW processor physical design. A stuck-at-0 and stuck-at-1 fault model was selected. Defects were injected into a placed-and-routed implementation of the design. Faults were assigned to gates and wires so that the probability of a device X becoming defective $p_{defect}$ was equal to: $p_{defect} \alpha A_x * \lambda_x$ where $A_x$ is the area of the device and $\lambda_x$ is the average estimated activity of the device. As such, large devices with high activity rates were most apt to fail, while small components or components with little activity are at lower risk.

Figure 9:
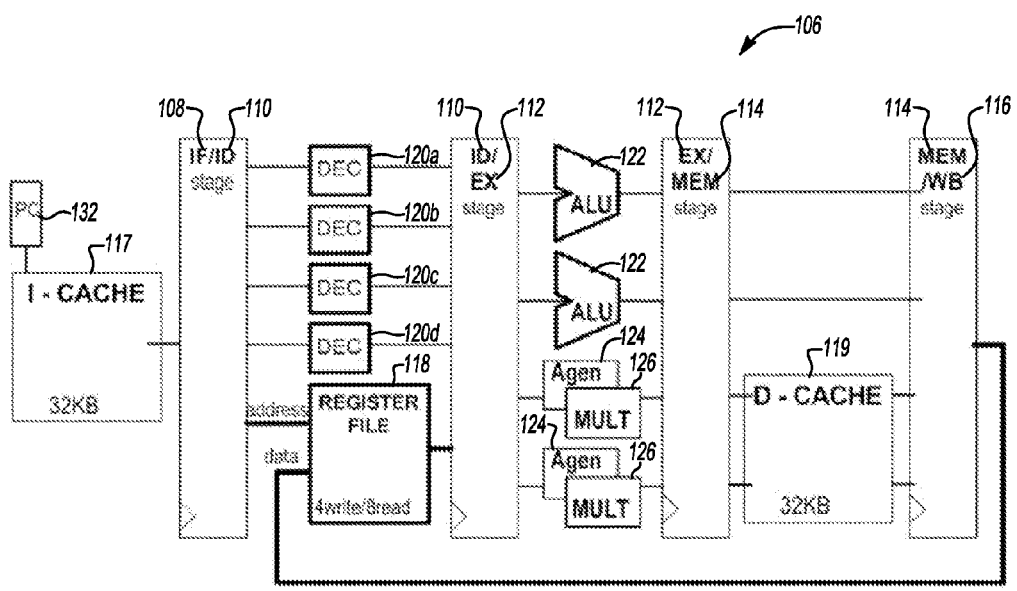
FIG. 9 is a block diagram of an embodiment of a microprocessor.

Referring now to FIG. 9, a baseline pipeline 106 includes a 4-wide VLIW processor with 32-bit fixed-point datapath. The instruction set of the processor is loosely based on the Alpha instruction set. Each VLIW instruction bundle is 128-bit long, consisting of 4 independent 32-bit instructions.

The processor pipeline 106 has five stages 108, 110, 112, 114, 116. The instruction fetch (IF) stage 108 is responsible for fetching the 128-bit VLIW instruction from a 32-KByte instruction cache 117. The instruction decode (ID) stage 110 decodes 4 independent instructions per cycle and reads register operands from a register file 118 with 8 read ports and 4 write ports. The execute (EX) stage 112 performs arithmetic operations, multiplications and address generation. The memory (MEM) stage 114 accesses a 32-KByte data cache 119 and main memory. Finally, the writeback (WB) stage 116 retires instruction results to the register file 118.

The register file 118 and a plurality of decoders 120n (120a-120d) are connected between pipeline registers separating stages 108 from 110 and 110 from 112. ALUs 122, address generation blocks 124 and multipliers 126 are connected between pipeline registers separating stages 110 from 112 and 112 from 114. The data cache 119 is connected between pipeline registers separating stages 112 from 114 and 114 from 116. The instruction cache 117 and program counter 132 are part of the instruction fetch stage 108 and are connected to the pipeline registers separating stages 108 from 110. The test architecture also includes specialized units 124, 126 to compute memory access addresses and/or execute multiply operations. Thus, each bundle of 4 instructions could include at most two ALU operations and two load/store/multiply operations. The latency of the ALUs 122 is one clock cycle, while the latency of the load/store/multiply units 124, 126 is three clock cycles. The latency of a miss on the instruction and data caches 117, 119 is 10 cycles.

The bandwidth requirements of testing are the number of vectors needed to fully test components for stuck-at-0 and stuck-at-1 faults. Table 1 lists the number of vectors to fully test each component, showing that few vectors are required to test each unit.

TABLE 1

| Component | Test vectors (or cycles) |
|---|---|
| ALU | 20 |
| MULT | 55 |
| Decoder | 63 |
| Register File | 128 |

Considering that the length of a computational epoch will typically be 1000's of cycles, testing may be completed using only occasional idle cycles. The caches 117, 119 are not listed in Table 1 because the use of parity bits allows for the continuous detection of defects.

The addition of test vector ROMs, where test vectors are stored, plus the checkers and checkpointing infrastructure bears a cost on the overall size of the design. Table 2 lists the total area of the defect tolerant component (Total area), the defect protection infrastructure area (Checker area), and the area that is covered by the test harness (Protected area).

TABLE 2

| Design Block | Total area (um2) | Checker area (um2) | % of tot. area | Protected area (um2) | % of tot. area |
|---|---|---|---|---|---|
| IF | 131323 | 4523 | 3.4 | 118190 | 90 |
| ID | 278396 | 22776 | 8.2 | 237726 | 85.4 |
| RF | 2698213 | 133213 | 4.9 | 2501787 | 92.7 |
| EX | 2140100 | 375580 | 17.5 | 1740486 | 81.3 |
| WB | 394673 | 4763 | 1.2 | 250165 | 63.4 |
| Overall Core | 5642705 | 540855 | 9.6 | 4848354 | 85.9 |
| I-cache 32 KB | 2037062 | 13012 | 0.6 | 1881416 | 92.4 |
| D-cache 32 KB | 2047472 | 13012 | 0.6 | 1891826 | 92.4 |
| Overall System | 9727239 | 566879 | 5.83 | 8621596 | 88.6 |

The coverage of the component is also shown as a percentage (this is the total fraction of the final design in which a defect that occurs will be detected and repaired). This metric can also be thought of as the probability that a defect in the component would be detected, given a random occurrence of a defect.

As shown in Table 2, area overheads for defect protection are quite modest, with most overheads less than 10%. The overheads within the caches are even lower, less than 1% for the prototype. Consequently, the overall overhead for defect protection is quite low. Adding support for defect protection increased the total area of the design by only 5.83%. The defect coverage is also quite good, with most components in the 80 and 90 percentiles. The overall coverage of the design, i.e., the total area of the final defect tolerant design in which a defect could be detected and corrected, is 88.6%. In other words, 9 out of 10 randomly placed defects would be detected and corrected by the prototype design.

Table 3 lists statistics about computational epochs for a variety of programs while running on the baseline VLIW processor with a 32 KByte 4-way set-associate data cache and an eight entry fully associative volatile victim cache.

TABLE 3

| Benchmark | Avg. epoch size (cycles) | Data L1 miss rate | Avg. ALU util. (%) | Avg. LSM util. (%) | Avg. Dec. util. (%) | Avg. reg. rw/cycle |
|---|---|---|---|---|---|---|
| 175.vpr | 50499 | 3.10 | 69.71 | 18.41 | 59.00 | 4.72 |
| 181.mcf | 120936 | 3.54 | 36.89 | 10.70 | 67.00 | 5.36 |
| 197.parser | 106380 | 2.10 | 54.22 | 19.71 | 52.25 | 4.18 |
| 256.bzip2 | 162508 | 8.88 | 55.91 | 33.93 | 73.50 | 5.88 |
| Unepic | 33604 | 17.16 | 68.70 | 14.29 | 55.50 | 4.44 |
| Epic | 196211 | 6.60 | 72.80 | 8.28 | 29.25 | 2.34 |
| mpeg2dec | 1135142 | 0.59 | 55.81 | 54.55 | 46.25 | 3.70 |
| Pegwitdec | 169617 | 10.42 | 62.15 | 45.06 | 62.50 | 5.00 |
| Pegwitenc | 304310 | 12.81 | 69.09 | 42.19 | 63.75 | 5.10 |
| FFT | 23145 | 1.49 | 56.88 | 43.95 | 33.50 | 2.68 |
| Patricia | 139952 | 1.19 | 55.20 | 37.69 | 57.75 | 4.62 |
| Qsort | 1184756 | 2.55 | 20.08 | 18.74 | 32.25 | 2.58 |
| Average | 302254 | 5.87 | 56.45 | 28.96 | 52.71 | 4.22 |

Listed is the average epoch size in cycles along with the L1 data cache miss rate. Also shown are statistics regarding the utilization of ALUs, L1 data cache memory ports (LSM), decoders, and register file ports. It appears from this table that the performance overhead of defect testing is quite low. For the program with the shortest average epoch length (FFT), the number of test cycles is at most 0.5% of the total number of cycles within the epoch. For this program, even if the testing during idle cycles could not complete, the performance impact would be negligible. All programs were able to complete testing within each epoch without delaying the start of the next.

It should be noted that there is a useful correlation between epoch length and average component utilization. For many of the programs with short epoch lengths, e.g., FFT and unepic, there are correspondingly low functional unit utilizations. This is to be expected because a program with a short epoch length would have a large amount of cache turnover, which in turn would lead to many pipeline stalls and low functional unit utilization, and plenty of time for defect testing. While programs with long epochs tend to have higher component utilization, they provide more time for the test harness to complete its task. In addition, the effect of cache geometry on average epoch size was examined, and it was found that there was little performance impact for defect testing for a wide range of cache geometries.

Once a defect has been located, the processor may be reconfigured by disabling the defective component. This reconfiguration may not allow as much parallelism as previously afforded in the unbroken pipeline, resulting in performance degradation.

In other embodiments, a processor pipeline and its cache memory system may be protected from both transient faults and permanent silicon defects. Given this fault model, a combination of on-line distributed checkers and microarchitectural checkpointing which efficiently identifies defects and recovers from their impact is presented. Certain embodiments of the microarchitectural checkpointing mechanism implement a capability to roll back execution up to 1000's of cycles. Using the protection of checkpointing, the on-line distributed checkers are periodically exercised to verify the functional integrity of the hardware. If the online tests succeed, the underlying hardware is known to be free of defects, and the previous checkpoint is no longer needed. If a defect is detected, processor state may be restored through the last checkpoint, and the hardware may be repaired by reconfiguring it to operate without the defective component, possibly with slight performance degradation. The redundancy of instruction-level parallel processors may be used to reduce repair costs. A double-sampling latch design may be utilized to protect the pipeline from transient faults and latch defects.

Some embodiments may include certain of the following features:
1) A resilient design capable of tolerating both transient and hard silicon faults. For a 15% area overhead, for example, 99% and 95% coverage against transient faults and silicon defects is provided, respectively.
2) A reflexive self-test which allows each distributed checker to check itself. This may obviate the need for expensive logic to check the functional integrity of the checkers, resulting in higher overall fault coverage with no increases in area costs.
3) Defect protection for arbitrary control logic blocks.

In certain embodiments discussed below, a computation is not checked. Rather, the underlying hardware is periodically verified: if a faulty component is detected, the computation is repaired by restoring the last known-good checkpoint. By avoiding expensive computation-checking hardware, significantly lower area costs may be achieved.

Figures 10, 11:
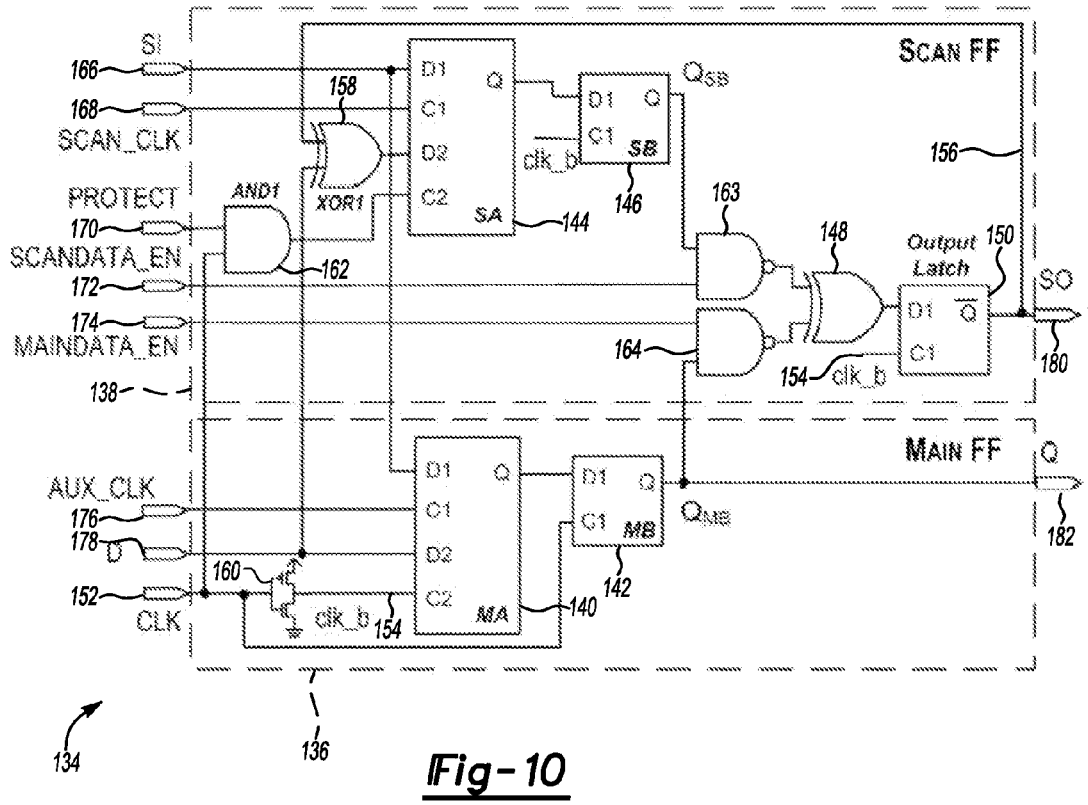
FIG. 10 is a schematic diagram of an embodiment of a fault-tolerant scan cell.
FIG. 11 is a table depicting different operating modes of the scan cell of FIG. 10.

Referring now to FIG. 10, an embodiment of a circuit 134 for transient fault detection based on a double-sampling latch which detects the occurrence of transient faults is provided. The fault-tolerant scan cell 134 may detect soft errors in both sequential and combinational logic. In addition, it may detect hard failures in sequential elements.

The embodiment of the SER-tolerant flip-flop 134 may include a main flip-flop (FF) block 136 and a scan flip-flop (FF) block 138. The main FF block 136 includes master and slave latches 140, 142. The scan FF block 138 also includes master and slave latches 144, 146. In addition, the scan FF block 138 includes an XOR gate 148 for detecting when the two master-slave FFs 136, 138 have latched different values (as is the case when an SER hits) and an additional latch 150 for storing this information permanently. The two blocks 136, 138 are fed with two distinct clocks, the main clock 152 and a skewed clock 154. In certain cases, the skewed clock 154 is the inverse of the main clock 152. The main FF 136 latches the incoming data signal on the positive edge of the clock, while the scan FF 138 samples the same signal on the skewed clock's positive edge. If an incorrect value is latched in the main FF 136 due to an SER, the glitch will subdue before the signal is latched again half a clock cycle later by the scan block 138. When this situation occurs, the XOR gate 148 outputs a 1, which is stored in the output latch 150. In addition, the output signal 156 is fed back to XOR1 gate 158, which forces the input of the scan FF 138 to always observe the complement of the data signal, continuously forcing an "SER-detected" situation. As apparent to those of ordinary skill, scan enabled flip flops (of which FIG. 10 is an enhanced version to provide SER tolerance) comprise the state elements of a microprocessor pipeline, and as such are used in part to implement the design components 16a-16e of FIG. 1.

As apparent to those of ordinary skill, the SER-tolerant flip-flop 134 also includes an inverter 160 (transistor), AND gate 162, and NAND gates 163, 164. Inputs are designated by 166, 168, 170, 172, 174, 176, 178. Outputs are designated by 180, 182. During processor mainstream operation, the data input to be stored is provided through the input 178, while the main clock signal is provided at the input 152. During manufacturing testing, when the processor undergoes normal testing routines, values can be stored in the latches through the scan chain design. The scan chain clock is provided at the input 168, and the scan-input value is provided at 164. To enable the use of the flip-flop 134 in scan-chain mode, the scan-data enable signal 172 should be used. During this same process, in order to evaluate test responses during manufacturing testing, the input 174 main data enable should be used to transfer out the values stored in the flip-flop 134 through the scan chain.

During normal system operation, it may be possible to activate the flip-flop 134 to log any occurrence of a transient fault by activating the input 170 protect, along with both scandata and maindata enable 172, 174. At the end of a computational epoch, it may also be possible to detect if a transient failure has occurred during the last epoch by pulsing the input 176 feed out and resetting the input protect 170.

The latch 134 works by relying on the assumption that transient faults manifest as logic glitches with a maximum duration of less than a clock cycle. This assumption is widely supported in both the VLSI and process technology literature. Given this assumption, the double-sampling latch 134 will reliably detect the presence of a transient fault logic glitch if it sees that the two samples differ. This difference can only occur when a transient fault logic glitch is at the input to the latch 134 when the clock ticks; since the duration between samples is larger than the worst-case glitch duration, the two samples must differ if a glitch is in process. The skewed clock 154 is provided to the scan latch 138 to implement the second logic sample, and a comparator (implemented in the embodiment of FIG. 10 by logic gates 148, 163, 164) validates the sample during the second half of the clock cycle. When a mismatch occurs, the scan latch 138 may lock to a logical one value until reset.

At the end of each computation epoch, all error signals are shifted out on the scan chain. In presence of an error, the faulty cell is tested individually using the scan chain to identify whether the fault was initiated by a soft or hard failure. Both SO 180 and Q 182 outputs of the faulty cell are captured, shifted out and verified to determine the possibility of hard failures in the main and scan flip-flops 136, 138. If no fault is detected in this test, it may be concluded that a soft error caused the original failure. Consequently, a suitable rollback mechanism may be activated to restore the last known correct state. Detection of any error in the test reveals that the error had been caused by a hard failure in one of the flip-flops 136, 138.

Therefore, the protection for the corresponding cell should be disabled and, based on the location of the hard failure, either the main flip-flop 136 or the scan flip-flop 138 may be used as the primary sequential element in that cell. Since it may be costly to selectively disable individual latches, protection for all flip-flops may be disabled, or sequential elements to several groups may be partitioned and individual control signals for each group may be added. By taking the latter approach, it may be possible to disable protection for one group and maintain fault tolerance for the rest of the chip.

Referring now to FIG. 11, different operating modes of the cell 134 and their corresponding input configurations are listed.

Another detailed physical design of a 4-wide VLIW processor including instruction and data caches, enhanced to include protection against SER faults and silicon defects is presented below.

Circuit-level evaluation was performed on a 4-wide VLIW prototype, specified in Verilog and synthesized for a 0.18 μm TSMC process using Synopsys Design Compiler. The design was then placed and routed using Cadence Sedsm, which in turn yields a physical design with wire capacitances and individual component areas. Finally, the design was back annotated to obtain a more accurate delay profile, and simulated with Synopsys PrimeTime to verify its timing and functional correctness.

Architectural evaluation was done using the Trimaran tool set, a re-targetable compiler framework for VLIW/EPIC processors, and the Dinero IV cache simulator. The simulator was configured to model the VLIW baseline configuration and memory hierarchy as detailed below. Designs were evaluated running benchmarks from SPECint2000, MediaBench and MiBench benchmark suites. These benchmarks cover a wide range of potential applications, including desktop applications, server workloads and embedded codes.

The baseline processor and memory architecture is a 4-wide VLIW architecture, with 32-Kbyte instruction and data caches. The instruction set of the processor is loosely based on Alpha instruction set. Each VLIW instruction bundle is 128-bit long, consisting of 4 independent 32-bit instructions. The processor pipeline has five stages, including instruction fetch, decode, execution, memory access and writeback.

Self-test BIST vectors were generated using hand-selected vectors, or by randomly cycling through random vector sets until a small group of effective vectors was located. Test vector coverage was verified by inserting a hard fault at each net of the design and then determining if a change in the output was observable for the current input test vector set. For a test vector set to provide full coverage, there should be at least one vector that identifies a hard fault in all nets of the design. Once the test vector set was identified, it was encoded into an on-chip ROM storage unit, created using Synopsys design tools. Coverage analysis simulation was performed by injecting faults into a logic timing level simulation of the detailed VLIW processor gate-level design. Defects were injected into the design (as stuck-at-one and stuck-at-zero faults), and the design was fully tested using a complete battery of functional tests. If the functional tests pass, the fault was masked, otherwise, the fault was not covered by fault tolerance hardware.

The coverage of fault-tolerant mechanisms was examined by measuring, through fault injection experiments, the fraction of faults covered. This fraction represents the overall design defect coverage. Table 4 lists the coverage of the overall design, as well as the coverage of individual processor components.

TABLE 4

| Design Block | Total Area (μm²) | Checker Area (μm²) | % of Total Area | Protected area (μm²) | % of Area (Coverage) |
| --- | --- | --- | --- | --- | --- |
| IF | 127374 | 8374 | 6.6 | 114359 | 89.8 |
| ID | 278396 | 22776 | 8.2 | 260605 | 93.6 |
| RF | 2698213 | 133213 | 4.9 | 2635000 | 97.7 |
| EX | 2992917 | 1166016 | 39.0 | 2896063 | 96.8 |
| WB | 170795 | 7208 | 4.2 | 158299 | 92.7 |
| Latches | 164256 | 122200 | 1.4 | 164002 | 99.0 |
| Overall Core | 6431951 | 1459787 | 22.7 | 6228582 | 96.8 |
| I-cache 32 KB | 2033345 | 9299 | 0.5 | 1881416 | 92.6 |
| D-cache 32 KB | 2043755 | 92992 | 0.5 | 1891826 | 92.6 |
| Overall System | 10509051 | 1478385 | 14.1 | 10001824 | 95.1 |

Design coverage is quite good. Overall design coverage is 95%, meaning that 95 out of 100 defects randomly placed into the process will be covered.

Examination of the design indicates that currently 95% of the area is protected from defects. Consequently, devising protection schemes for the remaining fraction of the design, even if very expensive, would not incur a significant area cost. The unprotected area of the design mainly consists of resources that do not exhibit inherent redundancy in the design, such as global interconnect and various glue logic.

The addition of test vector ROMs, where test vectors are stored, plus the checkers and checkpointing infrastructure bears a cost on the overall size of the design. Table 4 lists the total area of the defect tolerant component (Total area), the defect protection infrastructure area (Checker area), and the area that is covered by the test harness (Protected area). As shown in Table 4, area overheads for defect protection are quite modest, with most overheads being less than 10%. The overheads within the caches are even lower, less than 1% for the prototype. Consequently, the overall overhead for defect protection is quite low. Adding support for defect protection increased the total area of the design by only 14%. The defect coverage is also quite good, with most components in the mid-90 percentiles. The overall coverage of the design, i.e., the total area of the final defect tolerant design in which a defect could be detected and corrected, is 95%.

As the system runs, it will periodically pause to run online self-tests. These pauses constitute a down-time and a potential performance loss if they occur with too much frequency. The impact of this defect protection mechanism on the performance of programs running on the defect tolerant prototype design was examined. Table 5 lists the number of vectors to fully test each component, showing that few vectors are required to test each unit.

TABLE 5

| Component | # of test vectors |
| --- | --- |
| ALU | 20 |
| MULT | 55 |
| Decoder | 63 |
| Register File | 128 |
| Pipeline Control | 12 |
| Memory Control | 13 |

The bandwidth requirements of testing are the number of vectors needed to fully test components for stuck-at-0 and stuck-at-1 faults. The caches are not listed in Table 5 because the use of parity bits allow for the continuous detection of defects. The time required to fully test the hardware is quite small, only 128 cycles, with the register file taking the longest time to complete tests.

Table 6 lists statistics about computational epochs for a variety of programs while running on the baseline VLIW processor with a 32 Kbyte 4-way set associate data cache and an eight entry fully associative volatile victim cache.

TABLE 6

| Benchmark | Avg. epoch Size (cycles) | Testing Overheard (%) |
| --- | --- | --- |
| 175 vpr | 50499 | 0.51 |
| 181 mcf | 120936 | 0.21 |
| 197 parser | 106380 | 0.24 |
| 256 bzip2 | 162508 | 0.16 |
| unepic | 33604 | 0.76 |
| epic | 196211 | 0.13 |
| mpeg2dec | 1135142 | 0.02 |
| pegwitdec | 169617 | 0.15 |
| pegwitenc | 304310 | 0.08 |
| FFT | 23145 | 1.11 |
| patricia | 139952 | 0.18 |
| qsort | 1184756 | 0.02 |
| Average | 302254 | 0.08 |

Listed is the average epoch size in cycles along with the L1 data cache miss rate. Also shown are statistics regarding the utilization of ALUs, L1 data cache memory ports (LSM), decoders, and register file ports. The performance overhead of defect testing is quite low. Considering that testing will only take at most 128 cycles, performance impacts listed in the table are quite small. For the program with the shortest average epoch length (FFT), the number of test cycles is at most 0.5% of the total number of cycles within the epoch. For this program, even if testing could not complete during idle cycles, the performance impact would be negligible. Performance impacts were not graphed directly because there simply were none. All programs were able to complete testing within each epoch without delaying the start of the next.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microprocessor having a silicon area, comprising:
a plurality of transistors implemented on the silicon area; and
a fault detection unit operatively arranged with the plurality of transistors, occupying less than 20% of the silicon area, and configured to detect faults at runtime in at least 80% of the plurality of transistors based on run-time inspection of integrity of the plurality of transistors.

\* \* \* \* \*